(12) United States Patent
Xie et al.

(10) Patent No.: US 9,074,090 B2
(45) Date of Patent: Jul. 7, 2015

(54) SHAPE MEMORY POLYMER-BASED TUNABLE PHOTONIC DEVICE

(75) Inventors: Tao Xie, Troy, MI (US); William B. Carter, Calabasas, CA (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 13/087,444

(22) Filed: Apr. 15, 2011

(65) Prior Publication Data

US 2012/0262789 A1    Oct. 18, 2012

(51) Int. Cl.
| | |
|---|---|
| B29D 11/00 | (2006.01) |
| B82Y 20/00 | (2011.01) |
| C08L 63/00 | (2006.01) |
| G02F 1/01 | (2006.01) |

(52) U.S. Cl.
CPC .............. *C08L 63/00* (2013.01); *G02F 1/0147* (2013.01); *G02F 2203/02* (2013.01); *G02F 2203/05* (2013.01); *G02F 2203/62* (2013.01)

(58) Field of Classification Search
CPC .... C08L 63/00; G02F 1/0147; G02F 2203/02
USPC ...................... 264/1.1, 1.7, 2.7, 2, 6, 230, 231
IPC ...... B29D 11/0074; G02F 1/0128; B82Y 20/00
See application file for complete search history.

(56) References Cited

U.S. PATENT DOCUMENTS

| | | | |
|---|---|---|---|
| 6,721,476 | B2 | 4/2004 | Padmanabhan et al. |
| 6,991,847 | B2 | 1/2006 | Padmanabhan et al. |
| 7,283,716 | B2 | 10/2007 | Park et al. |
| 7,310,080 | B2 | 12/2007 | Jessop |
| 2005/0179836 | A1 | 8/2005 | Shimoyama et al. |
| 2008/0230752 | A1 | 9/2008 | Bower et al. |

(Continued)

FOREIGN PATENT DOCUMENTS

| | | |
|---|---|---|
| CN | 101560286 A | 10/2009 |
| JP | 2007041208 A | 2/2007 |

(Continued)

OTHER PUBLICATIONS

Taekwoong Chung, Angel Romo-Uribe, Patrick T. Mather, "Two-Way Reversible Shape Memory in a Semicrystalline Network", American Chemical Society, Jul. 9, 2007.

(Continued)

*Primary Examiner* — Mathieu D. Vargot
(74) *Attorney, Agent, or Firm* — Quinn Law Group, PLLC

(57) ABSTRACT

A photonic device is provided having a two or three-dimensionally periodic structure of interconnected members with alterable spacing between the members. The structure is composed of a shape memory polymer configured to be thermomechanically tunable to display a plurality of optical properties under a series of temperature changes and stress. A method of producing a photonic device based on a shape memory polymer is provided. A mold, having a two or three-dimensionally periodic structure of interconnected components with a characteristic spacing between the components, is infiltrated with a shape memory polymer precursor to form a composite structure. The composite structure is solidified. The mold is removed from the composite structure to form a photonic device as an inverse replica of the mold.

15 Claims, 2 Drawing Sheets

(56) References Cited

U.S. PATENT DOCUMENTS

| | | | |
|---|---|---|---|
| 2008/0262188 A1* | 10/2008 | Xie et al. ..................... | 528/98 |
| 2010/0079358 A1 | 4/2010 | Daniel et al. | |
| 2010/0150511 A1 | 6/2010 | Arsenault et al. | |
| 2011/0071271 A1 | 3/2011 | Xie et al. | |
| 2012/0120984 A1* | 5/2012 | Vanier et al. ................ | 374/161 |

FOREIGN PATENT DOCUMENTS

| | | |
|---|---|---|
| KR | 100922892 B1 | 10/2009 |
| WO | 2009143625 A1 | 12/2009 |

OTHER PUBLICATIONS

Jorg Zotzmann, Marc Behl, Dieter Hofmann, Andreas Lendlein, Reversible Triple-Shape Effect of Polymer Networks Containing Polypentadecalactone- and Poly(caprolactone)-Segments, 2010, pp. 3424-3429, 22, Advanced Materials.

Yongan Xu, Xuelian Zhu, Shu Yang, "Crack-Free 3D Hybrid Microstructures From Photosensitive Organosilicates as Versatile Photonic Templates", 2009, pp. 3251-3259, vol. 3, No. 10, American Chemical Society.

Tao Xie, "Tunable polymer multi-shape memory effect", Mar. 11, 2010, pp. 267-270, vol. 464, Macmillan Publishers Limited.

* cited by examiner

SHAPE MEMORY POLYMER-BASED TUNABLE PHOTONIC DEVICE

TECHNICAL FIELD

The present invention relates generally to photonic devices and in particular to a tunable photonic device based on a shape memory polymer.

BACKGROUND

Photonic crystals (or devices) are two dimensional or three dimensional systems with special optical characteristics that originate from periodic structures. The periodic modulation of refractive index gives rise to a photonic band gap in which electromagnetic radiation within a certain wavelength band are totally reflected. This leads to electromagnetic radiation within a certain wavelength being selectively diffracted or refracted, causing interference coloring.

Shape memory polymers are polymer materials which may be returned from a deformed state to their original shape via an external stimulus. The external stimulus typically is temperature in the case of thermally-activated shape memory polymers but can also be the application of an electric or magnetic field, light or a change in pH.

SUMMARY

A method of producing a photonic device based on a shape memory polymer is provided. The photonic device is configured to be thermo-mechanically tunable to display a plurality of optical properties under a series of temperature changes and stress. A mold is infiltrated with a shape memory polymer precursor to form a composite structure, where the mold has a two or three-dimensionally periodic structure of interconnected components with a characteristic spacing between the components. The composite structure is solidified. The mold is removed from the composite structure to form a photonic device as an inverse replica of the mold.

A photonic device is provided including a two or three-dimensionally periodic structure of interconnected members having alterable spacing between the members. The structure is composed of a shape memory polymer configured to be thermo-mechanically tunable to display a plurality of optical properties. The structure is configured to display an original optical property at an original spacing between the members. The structure is configured to display a first optical property in at least a portion of the structure in response to being heated to a first temperature and cooled to a second temperature under a first stress. The portion of the structure is configured to display a second optical property in response to being cooled to a third temperature under a second stress, the second stress being larger than the first stress. The portion of the structure is configured to display a third optical property in response to being cooled to a fourth temperature under a third stress, the third stress being larger from the second stress.

The original optical property is recovered by heating the portion of the structure to the first temperature. The first optical property is recovered by heating the portion of the structure to the second temperature. The second optical property is recovered by heating the portion of the structure to the third temperature. The structure may be composed of a perfluorosulfonic acid ionomer with a polytetrafluoroethylene (PTFE) backbone and perfluoroether sulfonic acid side chains. Optionally, a filling material, such as wax, may be added to the spacing between the members in the photonic device to further alter the optical properties of the photonic device.

The above features and advantages and other features and advantages of the present invention are readily apparent from the following detailed description of the best modes for carrying out the invention when taken in connection with the accompanying drawings.

DETAILED DESCRIPTION

Figure 1:
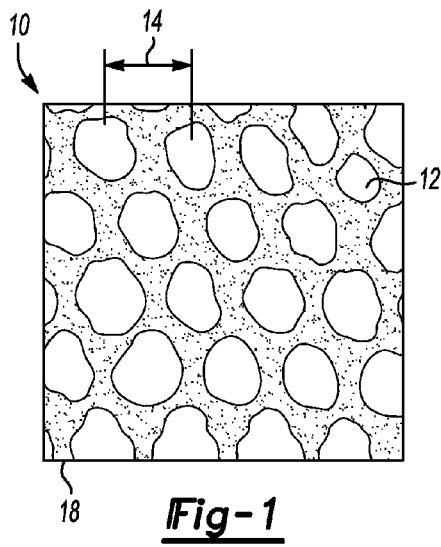
FIG. 1 is a schematic illustration of a photonic device in an original shape in accordance with the present disclosure.

Referring to the Figures, wherein like reference numbers refer to the same or similar components throughout the several views, a photonic device 10 is shown in FIGS. 1-4. The photonic device 10 is illustrated in an original shape 18 in FIG. 1 and a first temporary shape 20 in FIG. 2. Optionally, the photonic device 10 includes a second temporary shape 22, shown in FIG. 3, and a third temporary shape 24, shown in FIG. 4. The photonic device 10 is a two-dimensionally periodic structure of interconnected members 12, as shown in FIGS. 1-4. The members 12 may be pores, as shown in FIGS. 1-4. Alternatively, the members 12 may be interconnected spheres (as described below). In a two-dimensional periodic structure, the photonic device 10 has a finite thickness with a refractive index distribution that varies along two dimensions but with no periodicity in the thickness direction. The photonic device 10 may also be a three-dimensional periodic structure in which the refractive index distribution varies along three dimensions.

Figure 2:
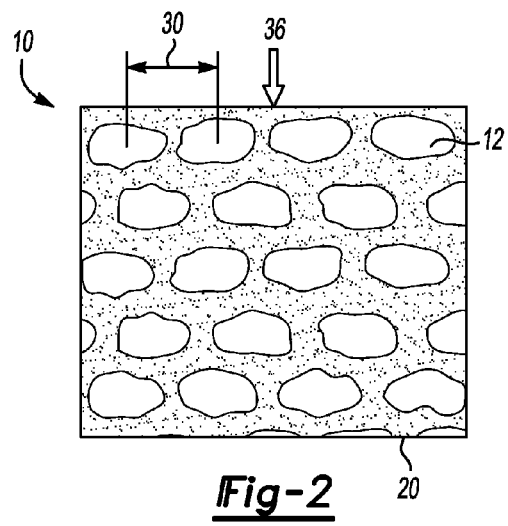
FIG. 2 is a schematic illustration of the photonic device of FIG. 1 in a first temporary shape.

Referring to FIG. 1, the members 12 in the original shape 18 are spaced from the center of one member 12 to the center of an adjacent member by an original spacing 14, at ambient temperatures and in the absence of stress (or load). Referring to FIGS. 1-2, the photonic device 10 is subjected to a first temperature change and a first stress 36 in order to transition from the original shape 18 to the first temporary shape 20. In one embodiment, the photonic device 10 in the original shape 18 is heated to a first temperature $T_1$. The photonic device 10 is then cooled to a second temperature $T_2$ and the first stress 36 is applied to fix the first temporary shape 20. This process changes the spacing between members 12 to a first spacing 30 (shown in FIG. 2). Generally, the first spacing 30 will increase when the first stress 36 is tensile and decrease when the first stress 36 is compressive.

Figure 3:
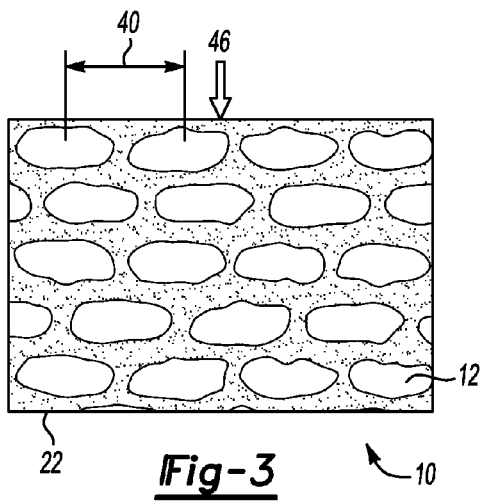
FIG. 3 is a schematic illustration of the photonic device of FIG. 1 in a second temporary shape.
Figure 4:
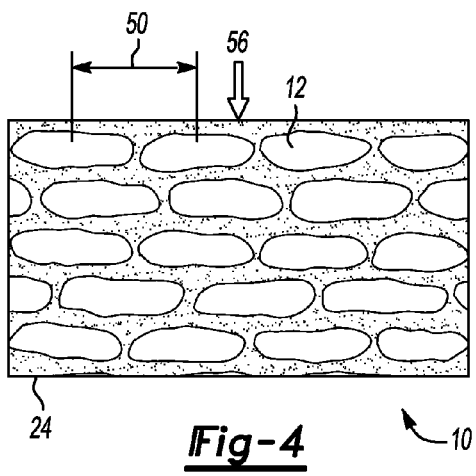
FIG. 4 is a schematic illustration of the photonic device of FIG. 1 in a third temporary shape.

Referring to FIGS. 2-3, the photonic device 10 is subjected to a second temperature change and a second stress 46 in order to transition from the first temporary shape 20 to the second temporary shape 22. In one embodiment, the photonic device 10 is deformed under a second stress 46 that is larger than the first stress 36 and cooled to a third temperature $T_3$. This process changes the spacing between members 12 to a second spacing 40 (shown in FIG. 3). Referring to FIGS. 3-4, the photonic device 10 is subjected to a third temperature change and a third stress 56 in order to transition from the second temporary shape 22 to the third temporary shape 24. In one embodiment, the photonic device 10 is cooled to a fourth temperature $T_4$. This process further changes the spacing between members 12 to a third spacing 50 (shown in FIG. 4).

Having alterable spacing between members 12 allows the photonic device 10 to be thermo-mechanically tuned to display varying optical properties. In the original shape 18, the photonic device 10 reflects electromagnetic radiation in an original wavelength band, which is dependent upon the original spacing 14. In the first temporary shape 20, the photonic device 10 reflects electromagnetic radiation in a first wavelength band, which is dependent upon the first spacing 30. In the second temporary shape 22, photonic device 10 reflects electromagnetic radiation in a second wavelength band, which is dependent upon the second spacing 40. In the third temporary shape 24, the photonic device 10 reflects electromagnetic radiation in a third wavelength band, which is dependent upon the third spacing 50. In other words, the photonic device 10 may be thermo-mechanically tuned to reflect an original color, a first color, a second color and a third color in the original shape 18, first temporary shape 20, second temporary shape 22 and third temporary shape 24, respectively. The original, first, second and third wavelength bands may be in the infrared, ultraviolet or visible spectrum of light.

For recovery, the third temporary shape 24 is heated to the third temperature $T_3$ in the absence of stress to yield the recovered second temporary shape 22. The recovered second temporary shape 22 remains stable until the temperature is further increased to the second temperature $T_2$ which leads to the recovered first temporary shape 20. The recovered first temporary shape 20 remains stable until the temperature is further increased to the first temperature $T_1$ which leads to the recovered original shape 18.

The first, second and third stresses 36, 46 and 56 may be uniformly applied to the entire photonic device 10 or locally applied to a portion of the photonic device 10. The first, second and third stresses 36, 46 and 56 may take the form of mechanical tensile pressure or compressive pressure. Optionally, the original, first, second and third spacings 14, 30, 40, 50 are less than 1000 nanometers. Optionally, the original, first, second and third spacing 14, 30, 40, 50 are between 100 and 3,000 nanometers.

Figure 5:
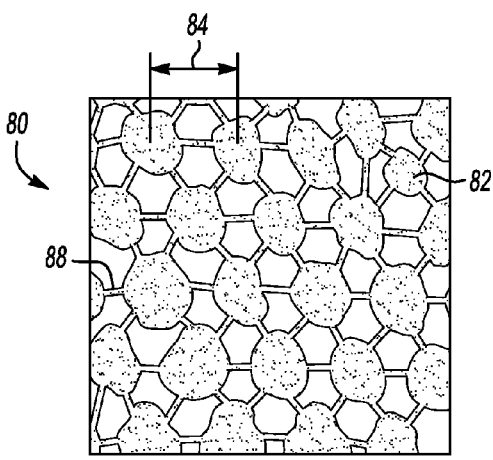
FIG. 5 is a schematic illustration of a mold that may be used for forming the photonic device of FIG. 1.

Next, a method 100 of producing the photonic device 10 is described with reference to FIG. 6. Beginning at step 102, a mold 80 (shown in FIG. 5) is constructed. FIG. 5 is a schematic illustration of a mold 80 that may be used for forming the photonic device 10 shown in FIG. 1. Mold 80 has a two or three-dimensional periodic structure with interconnected layers of members 82, as shown in FIG. 5. The members 82 are separated by a characteristic spacing 84. The members 82 may be spheres, cubes, inverse spheres, inverse cubes or any other suitable shape. The photonic device 10 produced will be an inverse replica of the mold 80. Thus, if the mold 80 includes interconnecting members 82 such as the spheres shown in FIG. 1, the photonic device 10 will be a hollow or porous structure. If the mold 80 is composed of inverse spheres (a porous structure similar to the structure shown FIG. 1), the photonic device 10 will form a structure of interconnected spheres similar to the structure shown in FIG. 5. The mold 80 may be formed with a polymeric, organic, inorganic, metallic or any other material that is amenable to forming a two or three-dimensional structure.

In one example of constructing the mold 80, spheres or members 82 (shown in FIG. 5) of silicon dioxide are assembled in a container (not shown) by centrifugating a colloidal solution of silicon dioxide. Next, necks 88 (shown in FIG. 5) between neighboring or adjacent members 82 are created to connect adjacent members 82 together. The necks 88 are formed by heating or sintering at high temperatures for several hours, causing adjacent members 82 to connect to one another. For silicon dioxide spheres, the sintering process can be accomplished from about 650° C. to about 900° C. The mold 80 may be also be formed by lithographic techniques or other suitable methods. Alternatively, the mold 80 may be composed of structured alumina.

Figure 6:
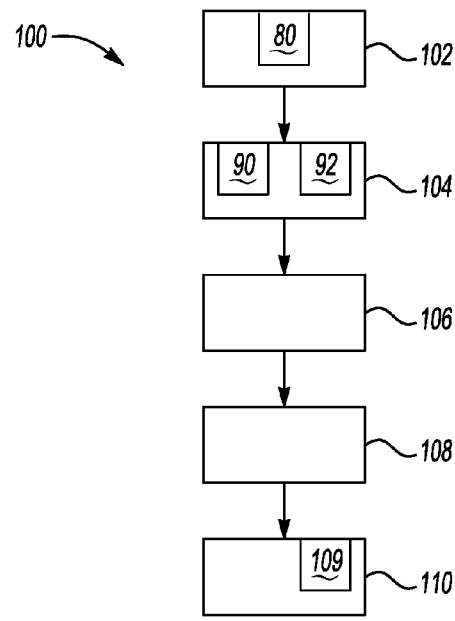
FIG. 6 is a schematic flow diagram describing a method for forming the photonic device of FIG. 1.

Referring to FIG. 6, at step 104, the mold 80 is filled with a shape memory polymer precursor 90 to form a composite structure 92. The shape memory polymer precursor 90 may be used in a liquid form at ambient temperature. The shape memory polymer precursor 90 may be derived from any type of shape memory polymer material. Referring to FIG. 6, at step 106 the composite structure 92 is solidified. Depending on the type of shape memory polymer precursor 90 used, the composite structure 92 may be solidified by curing, heating or cooling. Any appropriate method for solidification may be used.

At step 108, the mold 80 is removed from the composite structure 92 to produce the photonic device 10. Based on the material that the mold 80 is made of, one of ordinary skill in the art may select a solvent that selectively dissolves the mold 80 without damaging the shape memory polymer precursor 90. If the mold 80 is made of metal, it may be selectively dissolved with an acid solvent. If the mold 80 is composed of silicon dioxide, hydrofluoric acid or sodium hydroxide may be used to selectively remove the mold 80.

Optionally, at step 110, a filling material 109 is added to the photonic device 10 in order to vary the optical properties of the photonic device. The filling material 109 may be any solid or liquid that has a different optical property (such as refractive index) from the shape memory polymer precursor 90. The filling material 109 may also be added after the photonic device 10 has transitioned to the first, second or third temporary shapes 20, 22 and 24. The filling material 109 may be any non-volatile liquid or solid. In one example, the filling material 109 may be paraffin wax or other type of wax. The filling material 109 may deform along with the photonic device 10 as it goes through the various cycles of heating, deformation under stress, cooling and reheating. If the filling material 109 is a solid with a melting point in the range of the transition temperatures, it may melt during the various cycles. Depending on the particular application, the filling material 109 may be selected to have a melting point either within the range of or outside the transition temperatures of the photonic device 10.

In one embodiment, the precursor 90 may be a polymeric material having dual shape memory effect and capable of memorizing one temporary shape and one original shape upon activation by external stimuli such as heat (i.e. temperature changes), magnetism, light and moisture. For example, the precursor 90 may be epoxy. In this case, the photonic device 10 in an original shape 18 (shown in FIG. 1) is heated to a first temperature $T_1$ and deformed under a first stress 36 to obtain a first temporary shape 20 (shown in FIG. 2). The photonic device 10 is cooled to a second temperature $T_2$ to fix the first temporary shape 20. Reheating the photonic device 10 (in the first temporary shape 20) to the first temperature $T_1$ leads to the recovery of the photonic device 10 in the original shape 18.

In another embodiment, the precursor 90 may be a polymeric material having triple shape memory effect and capable of memorizing two temporary shapes and one original shape. For example, the precursor 90 may be a bi-layer polymeric material having a first layer of diglycidyl ether bisphenol A epoxy monomer (EPON 826 available from Hexion) and a second layer of polypropylene glycol)bis(2-aminopropyl) ethercuring agent (Jeffamine D-230 available from Hunstman).

In another embodiment, the precursor 90 may be a two-way reversible shape memory polymer that can change shape reversibly under a constant stress. For example, the precursor may be a mixture of poly(ethylene-co-vinyl acetate) and dicumyl peroxide. The precursor 90 may also be a crosslinked poly(cyclooctene). In this case, the photonic device 10 in an original shape 18 (shown in FIG. 1) is heated to a first temperature $T_1$ and deformed under a stress or load to obtain a first temporary shape 20 (shown in FIG. 2). While maintaining the stress, the photonic device 10 may cycle reversibly between the first temporary shape 20 and a second temporary shape 22 (shown in FIG. 3) by changing the temperature. In other words, the photonic device 10 may be heated to obtain the first temporary shape 20 and cooled to obtain the second temporary shape 22, as long as the stress is maintained. When the stress is removed, the photonic device 10 goes back to the original shape 18.

In another embodiment, the precursor 90 may be a polymeric material having quadruple-shape memory effect and capable of memorizing three temporary shapes 20, 22, 24 and one original shape 18. For example, the precursor 90 may be a thermoplastic perfluorosulfonic acid ionomer with a polytetrafluoroethylene (PTFE) backbone and perfluoroether sulfonic acid side chains (NAFION®). The perfluorosulfonic acid ionomer is available from Dupont. Referring to FIG. 6, at step 104, the perfluorosulfonic acid ionomer in liquid form is poured into the mold 80 to form the composite structure 92. The composite structure 92 is solidified by heating in a 100 degree Celsius oven for one hour. The mold 80 is removed by the various techniques described above, to produce a photonic device 10 (shown in FIG. 1) derived from the perfluorosulfonic acid ionomer.

Figure 7:
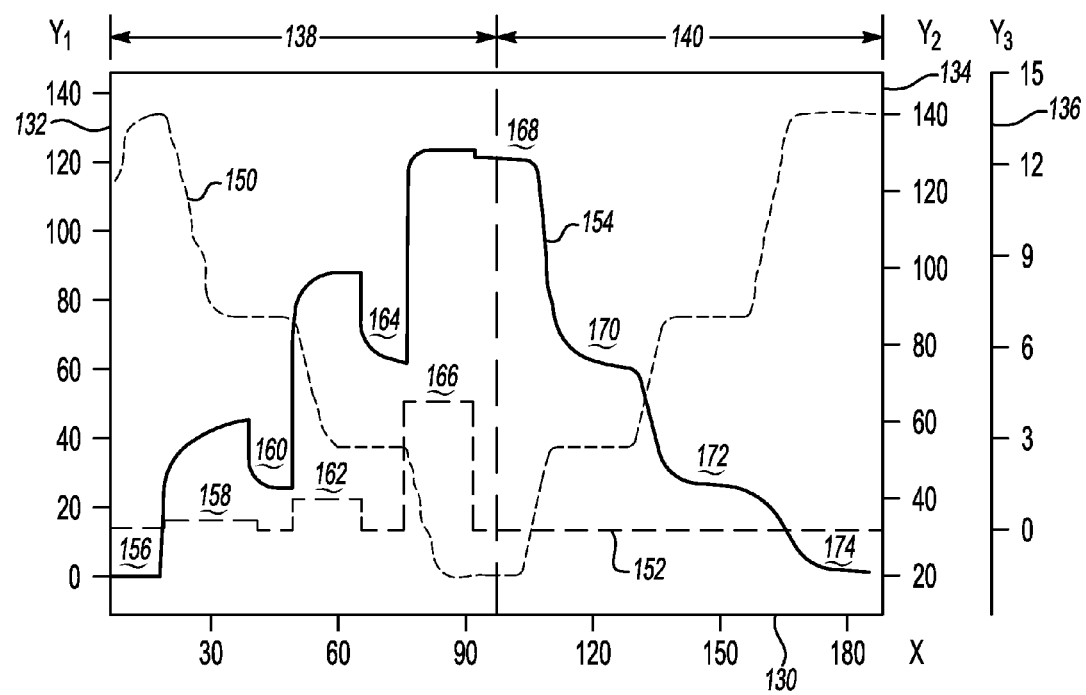
FIG. 7 is a graph illustrating an example of a quadruple-shape memory cycle of a perfluorosulfonic acid ionomer used for forming the photonic device of FIG. 1. Strain (%), temperature (° C.) and stress (MPa) are presented on vertical axes 132, 134 and 136, respectively. Time (minutes) is presented on the horizontal axis 130 and is in minutes.

The perfluorosulfonic acid ionomer is a single layer homogeneous material with a single broad glass transition range that incorporates a dual-, triple-, and quadruple-shape memory effect. The transition ranges from a first transition temperature of about 55° C. to a second transition temperature of about 130° C. FIG. 7 shows the quadruple-shape memory effect for a photonic device 10 composed of the perfluorosulfonic acid ionomer. Time is presented on the horizontal axis 130 and is in minutes. Strain, temperature and stress are presented on vertical axes 132, 134 and 136, respectively. The fixing stage of the graph is shown by the numeral 138 and the recovery stage by the numeral 140. Temperature is shown by line 150 (solid line) and is in Celsius units. Stress (MPa) is shown by line 152 (dash line) and is in units of Mega Pascal. Strain is shown by line 154 (solid bold line) and reflects percentage change in size or dimension with respect to the original dimension or size.

As demonstrated in FIG. 7, starting as an original shape A, the ionomer can memorize three temporary shapes B, C, and D in each shape memory cycle. Referring to the fixing stage 138 of the graph, the ionomer in the original shape A (shown at 156) was first heated to 140° C. and subjected to a relatively low stress of 0.3 MPa (shown at 158) as the ionomer was cooled at 5° C./min to 90° C. A first temporary shape B (shown at 160) having a strain of about 27% was set at this temperature. A larger stress of about 1.5 MPa (shown at 162) was applied as the ionomer was cooled to about 53° C. to set the ionomer in a second temporary shape C (shown at 164). When the stress was removed, the strain in the second temporary shape C (relative to the original shape) settled down at about 60%. A much larger stress of about 4.3 MPa (shown at 166) was applied as the ionomer was cooled to about 20° C. to set the ionomer in a third temporary shape D (shown at 168). When the stress was removed, the strain in the third temporary shape D settled down at about 120%.

Turning to the recovery stage 140 of the graph, the thrice-deformed ionomer (D) was heated to about 53° C. to obtain a recovered second temporary shape C (shown at 170). When the ionomer in the recovered second temporary shape C was heated to about 90° C., a recovered first temporary shape B (shown at 172) was obtained. When the ionomer in the recovered first temporary shape B was heated to 140° C., a recovered original shape A (shown at 174) was obtained.

In FIG. 7, first, second, third and fourth temperatures $T_1$, $T_2$, $T_3$, $T_4$ of 140° C., 90° C., 53° C. and 20° C., respectively, were used. The first, second, third and fourth temperatures $T_1$, $T_2$, $T_3$, $T_4$ may be varied. Other examples of first, second, third and fourth temperatures [$T_1$, $T_2$, $T_3$, $T_4$] include [120° C., 90° C., 55° C., 20° C.], [110° C., 85° C., 55° C., 15° C.] and [140° C., 110° C., 60° C., 20° C.].

In summary, a photonic device 10 composed of the perfluorosulfonic acid ionomer has an original shape at a first relatively high temperature and a selected strain level and three or more temporary shapes at progressively lower temperatures and different strain levels. The photonic device 10 may be initially used in its third temporary shape D indefinitely at a temperature below its lowest strain temperature. As the photonic device 10 experiences increasing temperatures (or other suitable stimulus) it progressively transforms its shape from its third temporary shape D to its second temporary shape C, and from its second temporary shape C to its first temporary shape B, and from its first temporary shape B to its original shape A.

While the best modes for carrying out the invention have been described in detail, those familiar with the art to which this invention relates will recognize various alternative designs and embodiments for practicing the invention within the scope of the appended claims.

The invention claimed is:

1. A method of producing a tunable photonic device, the method comprising:
   infiltrating a mold with a shape memory polymer precursor to form a composite structure, the mold having a two or three-dimensionally periodic structure of interconnected components with a characteristic spacing between the components;
   solidifying the composite structure;
   removing the mold from the composite structure to form a photonic device having a two or three-dimensionally periodic structure of interconnected members with an alterable spacing between the members, the photonic device being an inverse replica of the mold;
   filling the alterable spacing between the members in the photonic device with a filling material, the filling material being configured to have a different refractive index than the shape memory polymer precursor;
   wherein the photonic device is configured to be thermomechanically tunable to display a plurality of optical properties, the filling material being configured to vary the plurality of optical properties of the photonic device;

after the filling, heating the photonic device in an original shape to a first temperature and deforming under a first stress to produce a first temporary shape;

after the heating, cooling the photonic device to a second temperature such that the first temporary shape is fixed;

further cooling the photonic device to a third temperature and deforming under a second stress to produce a second temporary shape;

wherein the photonic device defines a transition range between the first temperature and the third temperature; and wherein the filling material is configured to have a melting point within the transition range such that the filling material melts within the transition range.

2. The method of claim 1, wherein the mold includes pores that are inverse replicas of an array of adjacent spheres and wherein necks exist between the adjacent spheres in the array.

3. The method of claim 1, wherein the mold is composed of structured alumina.

4. The method of claim 1, wherein the characteristic spacing is between 100 and 3,000 nanometers.

5. The method of claim 1, further comprising:
reheating the photonic device in the second temporary shape to the second temperature to recover the first temporary shape; and
reheating the photonic device in the first temporary shape to the first temperature to recover the original shape of the photonic device.

6. The method of claim 1, wherein: the shape memory polymer precursor is a mixture of poly(ethylene-co-vinyl acetate) and dicumyl peroxide; and the solidifying of the composite structure is by thermal curing.

7. The method of claim 1, wherein the photonic device is configured to cycle reversibly between the first temporary shape and the second temporary shape while the first or second stress is maintained.

8. The method of claim 1, wherein:
the shape memory polymer precursor is perfluorosulfonic acid ionomer with a polytetrafluoroethylene (PTFE) backbone and perfluoroether sulfonic acid side chains.

9. The method of claim 1, further comprising:
cooling the photonic device in the second temporary shape to a fourth temperature and deforming under a third stress to produce a third temporary shape;

reheating the photonic device in the third temporary shape to the third temperature to recover the second temporary shape;

reheating the photonic device in the second temporary shape to the second temperature to recover the first temporary shape; and reheating the photonic device in the first temporary shape to the first temperature to recover the original shape.

10. The method of claim 1, wherein the filling material is paraffin wax.

11. The method of claim 8, wherein:
the perfluorosulfonic acid ionomer defines the transition range between about 55° C. and about 130° C.

12. The method of claim 1, wherein:
the photonic device is configured to display an original optical property in the original shape;
the photonic device is configured to display a first optical property in the first temporary shape; and
the photonic device is configured to display a second optical property in the second temporary shape.

13. The method of claim 1, wherein:
the photonic device is configured to reflect an original color in the original shape;
the photonic device is configured to reflect a first color in the first temporary shape; and
the photonic device is configured to reflect a second color in the second temporary shape.

14. The method of claim 9, wherein:
the photonic device is configured to display an original optical property in the original shape;
the photonic device is configured to display a first optical property in the first temporary shape;
the photonic device is configured to display a second optical property in the second temporary shape; and
the photonic device is configured to display a third optical property in the third temporary shape.

15. The method of claim 9, wherein:
the photonic device is configured to reflect an original color in the original shape;
the photonic device is configured to reflect a first color in the first temporary shape;
the photonic device is configured to reflect a second color in the second temporary shape; and
the photonic device is configured to reflect a third color in the third temporary shape.

* * * * *